United States Patent
Brookner

(10) Patent No.: US 7,308,718 B1
(45) Date of Patent: Dec. 11, 2007

(54) TECHNIQUE FOR SECURE REMOTE CONFIGURATION OF A SYSTEM

(75) Inventor: George M. Brookner, Norwalk, CT (US)

(73) Assignee: Neopost Technologies, Bagneux (FR)

( * ) Notice: Subject to any disclaimer, the term of this patent is extended or adjusted under 35 U.S.C. 154(b) by 0 days.

(21) Appl. No.: 10/009,206

(22) PCT Filed: May 9, 2000

(86) PCT No.: PCT/US00/12721

§ 371 (c)(1),
(2), (4) Date: Mar. 6, 2002

(87) PCT Pub. No.: WO00/70503

PCT Pub. Date: Nov. 23, 2000

(51) Int. Cl.
*G06F 17/30* (2006.01)
*G06F 9/24* (2006.01)

(52) U.S. Cl. .......................................... 726/29; 713/1
(58) Field of Classification Search ..................... None
See application file for complete search history.

(56) References Cited

U.S. PATENT DOCUMENTS

| | | | |
|---|---|---|---|
| 5,142,577 A | 8/1992 | Pastor | 380/21 |
| 5,841,865 A * | 11/1998 | Sudia | 380/286 |
| 5,892,906 A * | 4/1999 | Chou et al. | 726/19 |
| 5,898,154 A | 4/1999 | Rosen | 235/379 |
| 5,950,011 A * | 9/1999 | Albrecht et al. | 713/100 |
| 6,092,189 A * | 7/2000 | Fisher et al. | 713/1 |

FOREIGN PATENT DOCUMENTS

| | | |
|---|---|---|
| WO | 98/26548 | 6/1998 |
| WO | WO 99/66422 | 12/1999 |

OTHER PUBLICATIONS

"Public-Key Cryptography And Open Systems Interconnection", IEEE Communications Magazine, vol. 30, No. 7, Jul. 1, 1992, pp. 30-35, XP000307910.
"A Method For Obtaining Digital Signature And Public-Key Cryptosystems", Rivest et al., Communications of the ACM, vol. 21, No. 2, 1978.

* cited by examiner

*Primary Examiner*—Nasser Moazzami
*Assistant Examiner*—Brandon S Hoffman
(74) *Attorney, Agent, or Firm*—Kenyon & Kenyon LLP

(57) ABSTRACT

After a processor-controlled system having communications capabilities is delivered to a user in its generic configuration, customization of the system is realized in accordance with the invention by downloading thereto selected information objects, e.g., software components and/or data, from a server. To avoid unauthorized downloading of the selected information objects, certain information in a request for the objects by the system to the server is encrypted and/or cryptographically signed. Such information may be, e.g., a serial number identifying the system. If the server succeeds in decrypting the encrypted information and/or authenticating the digital signature, and thereby verifies the identity and legitimacy of the system, the server downloads the selected information objects to realize the customization.

35 Claims, 2 Drawing Sheets

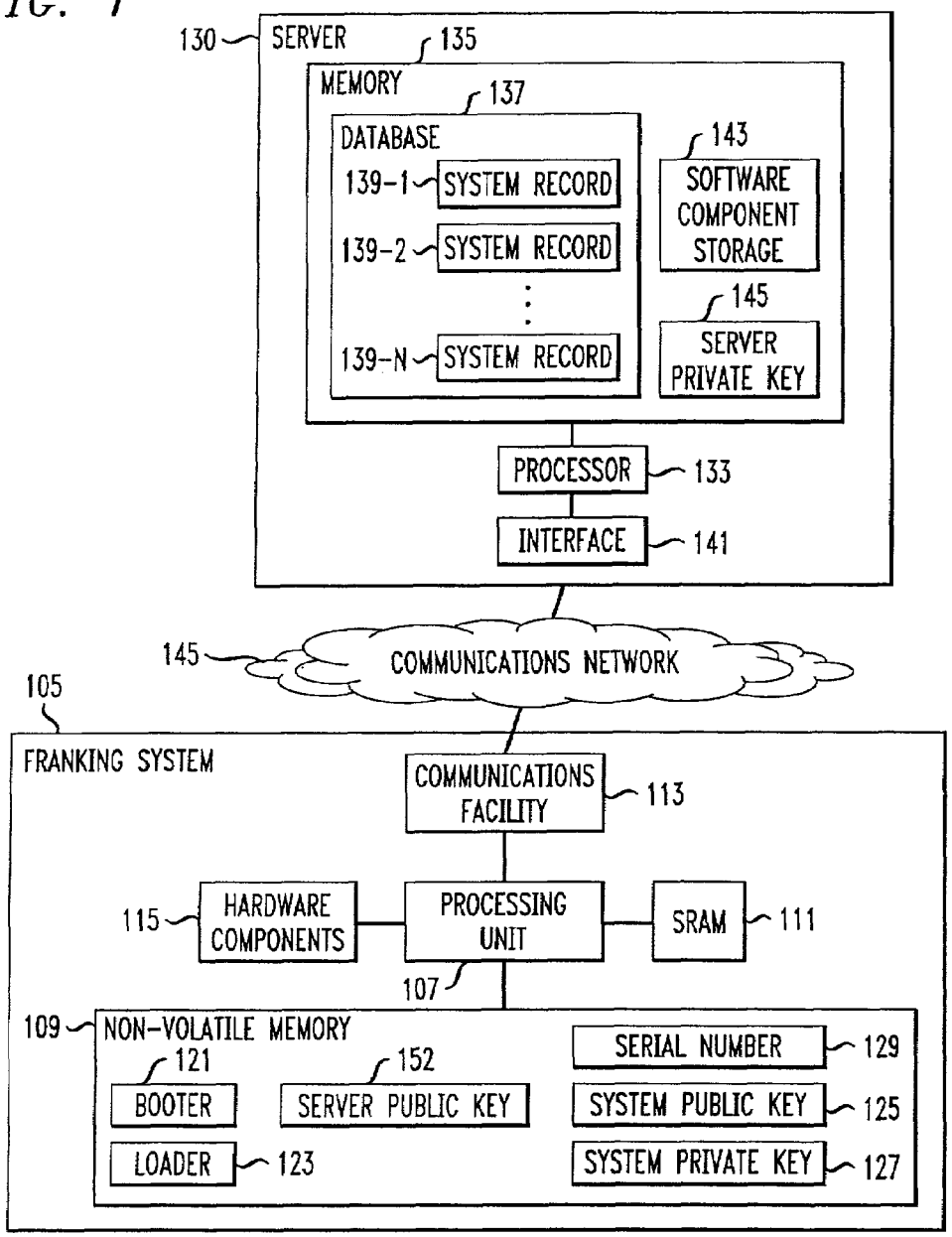
FIG. 1
FIG. 2
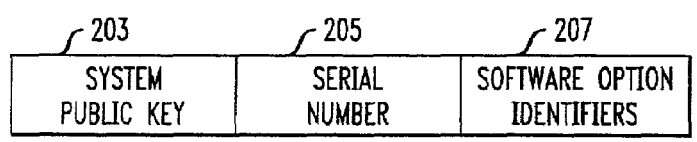

TECHNIQUE FOR SECURE REMOTE CONFIGURATION OF A SYSTEM

This application claims the benefit of the earlier filed International Application No. PCT/US00/12721, International Filing Date, May 9, 2000, which designated the United States of America, and which international English as WO Publication No. WO 00/70503.

TECHNICAL FIELD

The invention relates to a technique for system configuration, and more particularly to a technique for remotely configuring a system through a communications network in a secure manner.

BACKGROUND OF THE INVENTION

Use of processor-controlled (P-C) products, e.g., personal and hand-held computers, wireless information devices, postage franking systems, etc. is ubiquitous. However, people may utilize these P-C products differently to satisfy their individual needs. For that reason, P-C product manufacturers offer different options to customers for them to individualize the products. Typically, when a customer orders a P-C product from a manufacturer, he/she specifies the desired options for the product. In response, the manufacturer starts with a basic pre-assembled system having a generic configuration, and adds the specified options thereto to customize the system. The manufacturer then ships the resulting system to the customer to fulfill the order.

SUMMARY OF THE INVENTION

The customization by manufacturers of P-C products described above is beneficial to a customer in that the customer pays only for the product having the configuration specified by him/her, without overspending on some product features which the customer does not need. However, I have identified certain aspects of the prior art practice as being particularly disadvantageous. For example, after selecting a P-C product, a customer needs to wait for the manufacturer customization, which may take a long time because of a backlog. It is particularly frustrating for a customer after he/she spends much time selecting the desired P-C product in a store and cannot immediately bring home the product because of the need of the manufacturer customization.

I have recognized that in the manufacturer customization, the bulk of the time is expended on installing the software options specified by the customer in a basic system having a generic configuration. I have also recognized that most of the P-C products have a modem device therein or provide for similar capabilities for communicating data over a communications network. Thus, in accordance with the invention, the customer may be provided with the basic pre-assembled system having modem capabilities, and on his/her own download the specified software components onto the system from a server to customize the system. Advantageously, by shifting the customization burden onto the customer in accordance with the invention, the customer can be in possession of a P-C product as soon as the purchase thereof is consummated. In addition, the product manufacturer saves on the otherwise labor and time for installing the software options for the customer.

In accordance with the invention, a server is employed for configuring P-C devices through a communications network. Records associated with the devices are stored in the server. On initial power up of one such P-C device, the P-C device automatically generates a request for configuration thereof to the server through the communications network. This request includes coded information resulting from encrypting at least an identifier, e.g., a serial number, identifying the P-C device, or alternatively from cryptographically signing at least part of the request. In response to such a request, the server locates a record associated with the P-C device, and verifies the identity of the P-C device based on the coded information. The record includes second information concerning a device configuration specified by the customer. Only when the identity of the P-C device is verified, does the server provide through the communications network to the P-C device information objects, e.g., software components and/or data, for realization of the specified configuration based on the second information.

BRIEF DESCRIPTION OF THE DRAWING

Further objects, features and advantages of the invention will become apparent from the following detailed description taken in conjunction with the accompanying drawing, in which:

FIG. 1 illustrates an arrangement for configuring a system in accordance with the invention;

FIG. 2 illustrates the format of a system record stored in a server in the arrangement of FIG. 1.

DETAILED DESCRIPTION

Figure 3:
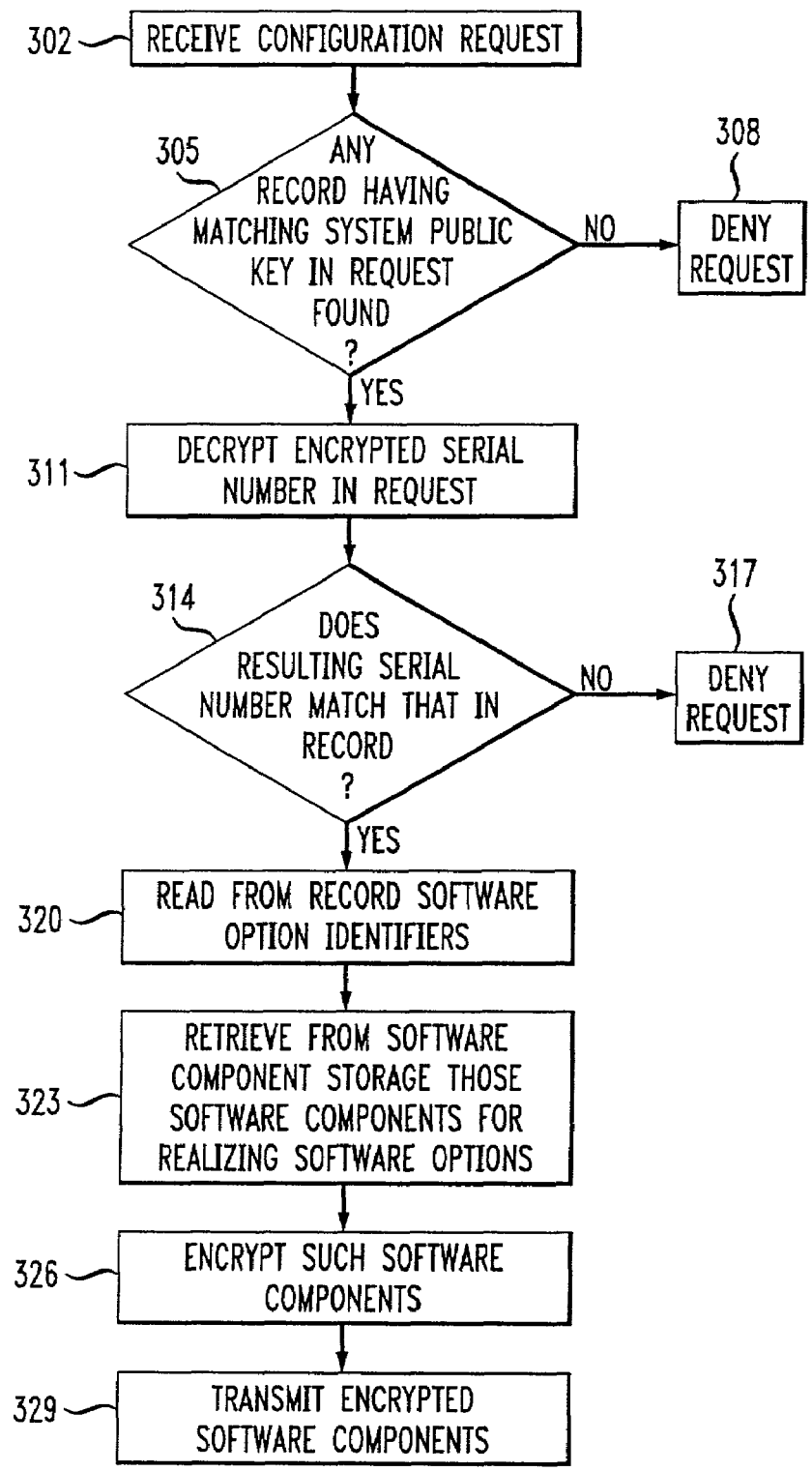
FIG. 3 illustrates a routine for providing software components from the server to the system to realize a specified system configuration.

FIG. 1 illustrates an arrangement embodying the principles of the invention in which a processor-controlled (P-C) system may be customized through a communications network. By way of example, this system is illustratively a franking system, numerically denoted 105, for generating postage indicia which serve as proof of payment of postage.

In accordance with the invention, system 105 when delivered to a user has a generic configuration, which includes processing unit 107 comprising one or more conventional processors, non-volatile memory 109, static random access memory (SRAM) 111, communications facility 113 which includes a modem device or similar circuitry or network card, and necessary hardware components 115 for carrying out the generation of postage indicia. This generic configuration allows subsequent system customization by the user to satisfy his/her individual needs. For example, in accordance with the invention, the user later may on his/her own integrate specified software options into system 105 to customize same. Thus, the manufacturer of system 105 in this instance does not customize the system for the user as in prior art. As a result, system 105 advantageously can be delivered to the user soon after the user places the order thereof. At the same time, the manufacturer saves on the otherwise labor and time for customizing system 105 for the user.

Server 130, which may be administered and maintained by the manufacturer of system 105, provides through communications network 145 the specified software options to realize the user customization in accordance with the invention. Communications network 145 may be, e.g., the Internet, a telephone network or other public or private network. Server 130 includes processor 133, memory 135, and interface 141 for establishing a communication connection with the systems served thereby, e.g., system 105. When the user orders system 105 with certain software and hardware options selected by the user, the manufacturer causes system 105 having a generic configuration and the selected hardware options delivered to the user. At the same time, the manufacturer causes server 130 to create a record therein, registering the selected software options and/or hardware options of system 105. Without loss of generality, in this instance the software options but not the hardware options are registered in such a record. To that end, database 137 is maintained by server 130 in memory 135, which contains system records 139-1 through 139-N, associated with N different systems served by server 130, respectively, where N represents an integer greater than zero. Without loss of generality, let's assume here that system record 139-1 is associated with system 105.

FIG. 2 illustrates the format of a generic system record denoted 200. As shown in FIG. 2, record 200 includes field 203 containing a system public key for decrypting messages from the system associated with the record in a manner described below, field 205 containing a serial number assigned to the system for identifying same, and field 207 contains identifiers indicating the software options selected by the user.

When the user receives the package containing system 105 having the generic configuration, and selected hardware components for realizing the hardware options specified by the user, the user connects the selected hardware components to system 105 pursuant to the instructions provided by the manufacturer. To realize the software options specified by the user, programs such as booter 121 including basic input/output system (BIOS) functions, and loader 123 are provided and pre-stored in non-volatile memory 109 in system 105. On initial power up of system 105 and connection thereof to network 145 through communication facility 113, booter 121 is invoked which performs conventional system start-up functions which include, among others, causing loader 123 to be copied into SRAM 111 at a specified location to which a program vector points. Directed by the program vector, processing unit 107 executes the code of loader 123 in SRAM 111.

Instructed by the code of loader 123, unit 107 causes communications facility 113 to establish a communication connection with server 130 through network 145. Unit 107 transmits a configuration request for software components from server 130 to realize the specified software options. However, in accordance with an aspect of the invention, security measures are implemented to ensure that system 105 is a legitimate system to receive the software components from server 130. For example, a cryptographic methodology may be implemented to encrypt and/or cryptographically sign certain information in the request from system 105. The success by server 130 in decrypting the resulting encrypted information and/or authenticating the resulting digital signature verifies the identity and legitimacy of system 105. One such cryptographic methodology is the RSA methodology, named after its developers, Rivest, Shamir and Adleman. For details on the RSA methodology, one may refer to: R. Rivest et al., "A Method for Obtaining Digital Signatures and Public Key Cryptosystems," *Communications of the ACM*, Vol. 21, No. 2, February 1978. The RSA methodology involves a public key algorithm which uses a private key and a public key for data encryption. Unlike a private key which is securely protected from the public, a public key can be published and made known to the public. The keys for the RSA algorithm are generated mathematically, and are computational inverses to each other. The success of the RSA methodology depends on the use of very large numbers for the keys.

Thus, for example, in implementing the RSA methodology here, a key pair consisting of system public key 125 and system private key 127 are assigned to system 105, which are pre-stored in memory 109. In addition, as mentioned before a serial number, denoted 129, is assigned to system 105 to identify same, which is pre-stored in memory 109. In this instance, the aforementioned configuration request by system 105 includes information concerning (a) system public key 125 and (b) serial number 129 which is encrypted using system private key 127 in accordance with the RSA methodology.

Upon receiving the configuration request through interface 141, as indicated at step 302 in FIG. 3, processor 133 at step 305 searches database 137 for any system record having field 203 thereof matching system public key 125 in the request. If no such record is found, processor 133 at step 308 denies the configuration request. Otherwise, if any such record (e.g., record 139-1 associated with system 105 in this instance) is found, processor 133 at step 311 decrypts the encrypted serial number in the request using received system public key 125 or alternatively the matching system public key in field 203 of the record, in accordance with the RSA methodology. Processor 133 at step 314 determines whether the resulting serial number matches that in field 205 of the record. If they do not match, processor 133 at step 317 denies the configuration request. Otherwise, if they match, processor 133 at step 320 reads from field 207 of the record the identifiers indicating the software options specified by the user for installation in system 105. Based on such identifiers, processor 133 at step 323 retrieves from software component storage 143 those software components for realizing the specified software options. To ensure secure transmission, and prevent unauthorized use, of such software components to system 105, processor 133 at step 326 encrypts the software components using server private key 145, in accordance with the RSA methodology. Processor 133 at step 329 transmits the encrypted software components to system 105 through the established communication connection.

After receiving the encrypted software components, processing unit 107 in system 105 utilizes server public key 152, which corresponds to server private key 145 and is pre-stored in memory 109, to decrypt the received software components. The resulting software components, which contain software identifications (IDs) in their headers, are then loaded into SRAM 111, in accordance with a program vector table. This program vector table, e.g., in the form of a memory map, specifies the memory locations in SRAM 111 for the respective software components identified by their software IDs, and thus the order of execution of these software components. As processing unit 107 executes the downloaded software components, the specified software options are realized.

The foregoing merely illustrates the principles of the invention. It will thus be appreciated that those skilled in the art will be able to devise numerous other arrangements which embody the principles of the invention and are thus within its spirit and scope.

For example, the invention is disclosed in the context of an initial configuration of system 105 after it is delivered to the user. However, it is apparent from the disclosure heretofore that the inventive methodology is equally applicable to a re-configuration of the system after the initial configuration. In that case, loader 123 can be re-invoked to download additional software components from server 130 to modify the initial configuration.

Moreover, in the disclosed embodiment, software components are downloaded to system 105 from server 130 to realize desired system options. It is apparent that selected data, e.g., those concerning the user and/or his/her preferences, may also be downloaded to the system to customize same.

In addition, in the disclosed embodiment, server 130 maintains system record 200 for each system served thereby. The information in field 207 of record 200 enables server 130 to keep track of the current configuration of the system. Server 130 may also rely on the software IDs of the downloaded software components to keep track of the current configuration of the system. Such software IDs may contain version numbers of the respective downloaded software components and may also form part of record 200. When any new versions of the downloaded software components become available, with the knowledge of the current version number of each downloaded software component in the system, server 130 can effectively inform the user of such new versions for upgrading purposes. Moreover, the software IDs identifying the downloaded software components currently installed in the system may also be cataloged and stored in the system itself. In that case, a re-configuration of the system can be accomplished in a more secure manner by downloading additional software components together with an authorization code from server 130. As described in PCT International Publication No. WO 99/66422, published on Dec. 23, 1999, such an authorization code may be derived by server 130 from, among others, the serial number of the system and new software IDs identifying the additional software components. After receiving the additional software components including the software IDs in their headers, and the authorization code, the system independently generates an authorization code based on the received software IDs and the serial number stored in the system. Only if the generated authorization code corresponds to the received authorization code, is the system allowed to install the additional software components therein.

Further, in the disclosed embodiment, the configuration request by system 105 includes information, e.g., the serial number identifying system 105, which is encrypted. However, as mentioned before, such information may be cryptographically signed using the RSA or other cryptographic methodology such as the digital signature algorithm (DSA) or Elliptic Curve algorithm, instead. In that case, the authentication of the resulting digital signature verifies the identity of system 105.

Finally, server 130 and system 105 are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriate memories, and/or appropriately programmed processors.

The invention claimed is:

1. An apparatus for serving a plurality of devices through a communications network, the apparatus comprising:
    a memory for storing a plurality of records associated with the devices, respectively;
    an input element for receiving from a selected device a request that is generated only upon initial power up of the selected device for configuration of the selected device from a generic configuration to a selected or custom configuration through the communications network, the request including coded information;
    a processor responsive to the request for locating a record associated with the selected device, and verifying an identity of the selected device based on the coded information, the record including stored information concerning the selected or custom configuration for the selected device, the selected or custom configuration corresponding to a predetermined feature set of the selected device; and
    an output element for providing through the communication network to the selected device information objects for modifying the generic configuration to the selected or custom configuration based on the stored information when the identity of the selected device is verified.

2. The apparatus of claim 1 wherein the coded information comprises encrypted information concerning the identity of the selected device.

3. The apparatus of claim 2 wherein the coded information comprises encrypted information concerning a serial number of the selected device.

4. The apparatus of claim 2 wherein the encrypted information is encrypted in accordance with a public key algorithm.

5. The apparatus of claim 1 wherein the coded information comprises a digital signature resulting from cryptographically signing at least part of the request.

6. The apparatus of claim 1 wherein the information objects include software components.

7. The apparatus of claim 1 wherein the information objects include data.

8. An apparatus configurable by a server through a communications network, the apparatus comprising:
    a processor for generating a request that is generated only upon initial power up of the apparatus for configuration of the apparatus from a generic configuration to a selected or custom configuration which includes therein coded information for verification by the server of an identity of the apparatus, the coded information being generated using a cryptographic element;
    an interface for receiving information objects corresponding to a predetermined feature set of the apparatus for configuring the apparatus from the server through the communications network when the identity of the apparatus is verified by the server, the information objects modifying the generic configuration of the apparatus;
    a memory; and
    a loader for directing the information objects to be loaded in the memory in accordance with a predetermined plan.

9. The apparatus of claim 8 wherein the cryptographic element includes a private key.

10. The apparatus of claim 8 wherein the request is automatically generated on an initial power up of the apparatus.

11. The apparatus of claim 8 wherein the coded information comprises a digital signature resulting from cryptographically signing at least part of the request.

12. The apparatus of claim 8 comprising a franking system.

13. The apparatus of claim 8 wherein the information objects include software components.

14. The apparatus of claim 8 wherein the information objects include data.

15. An apparatus for serving a plurality of devices through a communications network, the apparatus comprising:
    a memory for storing a plurality of records associated with the devices, respectively;

an input element for receiving from a selected device a request that is generated only upon initial power up of the selected device, for configuration of the selected device from a generic configuration to a selected or custom configuration through the communications network, the request including a cryptographic element, and first information concerning a first identifier identifying the selected device, the first information being encrypted;

a processor for selecting a record based on the cryptographic element, the selected record including a second identifier and configuration information concerning the selected or custom configuration for the selected device, the selected or custom configuration corresponding to a predetermined feature set of the selected device, the processor determining whether the second identifier corresponds to the first identifier obtained by decrypting the first information using the cryptographic element; and an output element for causing the generic configuration of the selected device to be configured based on the configuration information when it is determined that the second identifier corresponds to the first identifier.

16. The apparatus of claim 15 wherein the cryptographic element includes a public key.

17. The apparatus of claim 15 wherein the first identifier includes a serial number of the selected device.

18. The apparatus of claim 15 wherein the first information is encrypted in accordance with a public key algorithm.

19. A method for use in an apparatus for serving a plurality of devices through a communications network, the method comprising:

storing a plurality of records associated with the devices, respectively;

receiving from a selected device a request that is generated only upon initial power up of the selected device for configuration of the selected device from a generic configuration to a selected or custom configuration through the communications network, the request including coded information;

in response to the request, locating a record associated with the selected device;

verifying an identity of the selected device based on the coded information, the record including stored information concerning the selected or custom configuration; and providing through the communication network to the selected device information objects for modifying the generic configuration to the selected or custom configuration based on the stored information when the identity of the selected device is verified, the information objects corresponding to a predetermined feature set of the selected device.

20. The method of claim 19 wherein the coded information comprises encrypted information concerning the identity of the selected device.

21. The method of claim 20 wherein the coded information comprises encrypted information concerning a serial number of the selected device.

22. The method of claim 20 wherein the encrypted information is encrypted in accordance with a public key algorithm.

23. The method of claim 19 wherein the coded information including a digital signature resulting from cryptographically signing at least part of the request.

24. The method of claim 19 wherein the information objects include software components.

25. The method of claim 19 wherein the information objects include data.

26. A method for use in an apparatus configurable by a server through a communications network, the apparatus including a memory, the method comprising:

generating a request only upon an initial power up of the apparatus for configuration of the apparatus from a generic configuration to a selected or custom configuration which includes therein coded information for verification by the server of an identity of the apparatus, the coded information being generated using a cryptographic element;

receiving information objects corresponding to a predetermined feature set of the apparatus for modifying the generic configuration of the apparatus to the selected or custom configuration from the server through the communications network when the identity of the apparatus is verified by the server; and loading the information objects in the memory in accordance with a predetermined plan.

27. The method of claim 26 wherein the cryptographic element includes a private key.

28. The method of claim 26 wherein the request is automatically generated on an initial power up of the apparatus.

29. The method of claim 26 wherein the coded information comprises a digital signature resulting from cryptographically signing at least part of the request.

30. The method of claim 26 wherein the information objects include software components.

31. The method of claim 26 wherein the information objects include data.

32. A method for use in an apparatus for serving a plurality of devices through a communications network, the method comprising:

storing a plurality of records associated with the devices, respectively;

receiving from a selected device a request that is generated only upon initial power up of the selected device for configuration of the selected device from a generic configuration to a selected or custom configuration through the communications network, the request including a cryptographic element, and first information concerning a first identifier identifying the selected device, the first information being encrypted;

selecting a record based on the cryptographic element, the selected record including a second identifier and configuration information concerning the selected or custom configuration for the selected device, the selected or custom configuration corresponding to a predetermined feature set of the selected device;

determining whether the second identifier corresponds to the first identifier obtained by decrypting the first information using the cryptographic element; and causing the generic configuration of the selected device to be modified from the generic configuration to the selected or custom configuration based on the configuration information when it is determined that the second identifier corresponds to the first identifier.

33. The method of claim 32 wherein the cryptographic element includes a public key.

34. The method of claim 32 wherein the first identifier includes a serial number of the selected device.

35. The method of claim 32 wherein the first information is encrypted in accordance with a public key algorithm.

* * * * *